Patented Aug. 30, 1932

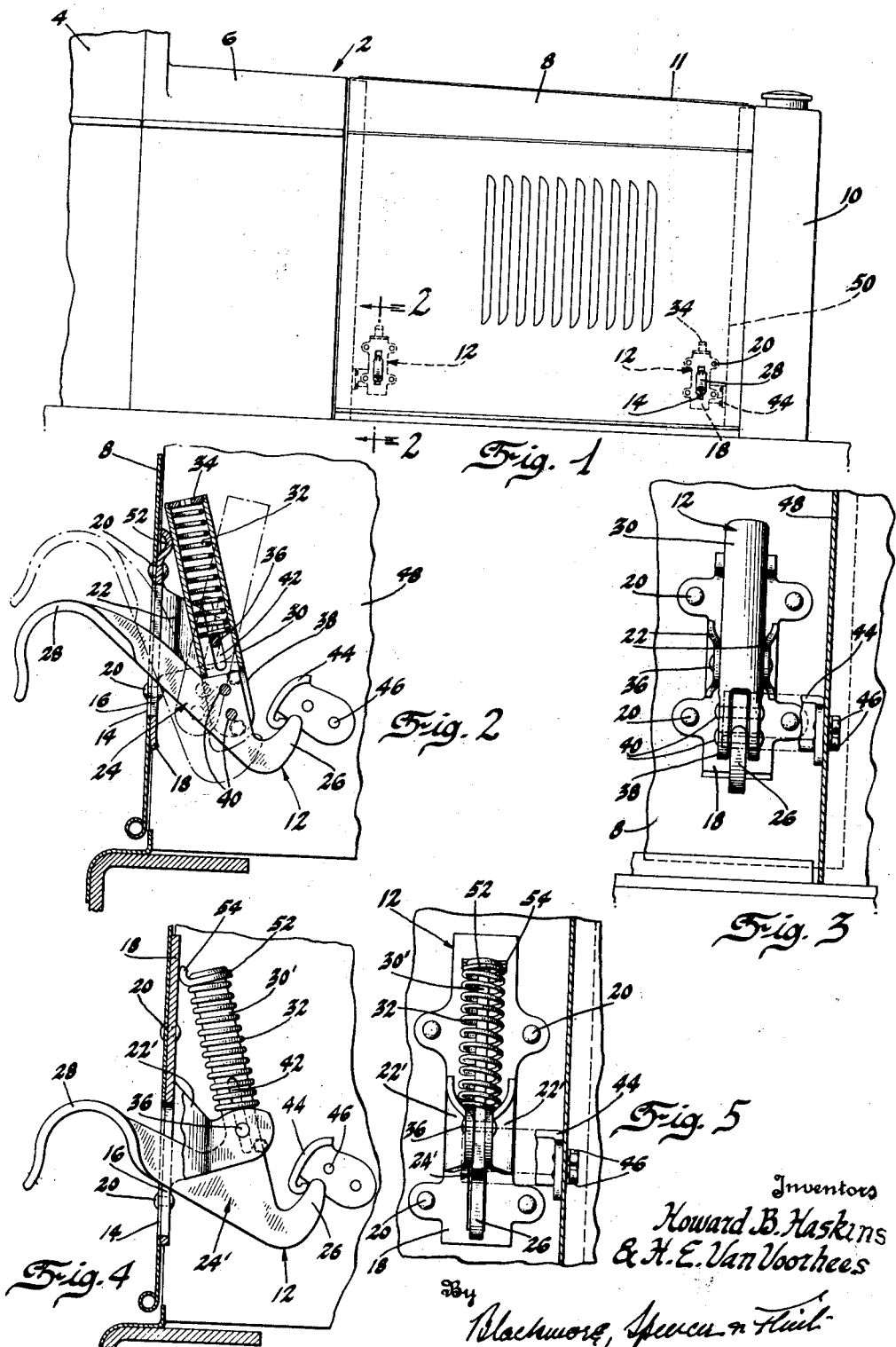

1,874,289

UNITED STATES PATENT OFFICE

HOWARD B. HASKINS AND HAROLD E. VAN VOORHEES, OF DETROIT, MICHIGAN, ASSIGNORS TO TERNSTEDT MANUFACTURING COMPANY, OF DETROIT, MICHIGAN, A CORPORATION OF MICHIGAN

HOOD LATCH

Application filed January 15, 1931. Serial No. 508,900.

This invention relates to hood latches used to hold down the hoods of automotive vehicles.

The invention relates to the type of hood latch which is concealed in the hood and has only the handle portion projecting outwardly therefrom. Latches of this kind are old and the present invention relates to detailed improvements in the latch.

The latch of the invention comprises a bracket secured to the inside of the hood and having pivoted thereto a hook member provided with a handle. The hook member is adapted to engage under a keeper rigidly mounted on the vehicle. The hook member has a projection extending upwardly therefrom which projection may be integral or separately constructed and rigidly secured to the hook. The projection confines a coil spring which at all times urges the hook of the latch in a direction to engage the keeper. A sufficient amount of lost motion is allowed at the pivot of the latch to allow the latch to move bodily as well as pivotally.

On the drawing:

Figure 1 is a side view of a portion of an automotive vehicle showing the hood with the hood latches applied.

Figure 2 is a section on the line 2—2 of Figure 1.

Figure 3 is a view of the structure of Figure 2 looking from the right with parts broken away.

Figures 4 and 5 are views corresponding to Figures 2 and 3 of a modification.

Referring to the drawing, the numeral 2 indicates an automotive vehicle as a whole. The vehicle has the usual body 4, cowl 6, hood 8 and radiator shell 10. The hood 8 is hinged at 11 and is secured to the vehicle by means of the usual hood latches indicated as a whole at 12.

At each hood latch 12 the hood 8 is provided with an opening 14 which mates with an opening 16 in a bracket 18 rigidly secured to the inside of the hood by means of the rivets 20. The bracket 18 has the ears 22 which project inwardly of the hood and are provided with openings. Pivoted between the ears 22 in the openings thereof is the hook member 24 which has the hook 26 at one end and the handle 28 exterior to the hood at the other end. The handle 28 projects through the openings 14 and 16 and is accessible from the outside of the hood. The hook member 24 also includes the outwardly projecting portion 30 which, in the species of Figures 2 and 3, is cylindrical in form and houses a coil spring 32 held therein by means of the plug 34 screw-threaded into the cylinder end. The opposite end of the spring rests against the bolt 36 forming the pivot between the member 24 and the ears 22. The extension 30 is separately constructed and has the fork 38 at its lower end by means of which it is riveted as at 40 to the member 24 adjacent the hook 26. Slots 42 in the extension 30 receive the pivot bolt 36 and are for the purpose of allowing a bodily movement of the latch as well as a pivotal movement. The spring 32 always presses against the plug 34 and urges the hook 26 into engagement with the keeper 44 which is rigidly mounted as shown at 46 to the dashboard 48. At the front of the engine the keeper 44 may be mounted on the hood support 50 or any suitable part of the radiator or the vehicle.

The bracket 18 is provided with a rib 52 which serves as a slide for the projection or barrel 30 which houses the spring.

The operation of the device is as follows: The position of the parts in their normal position is shown in Figure 2. When the operator desires to raise the hood, he seizes the handles 28 and pulls them upwardly to force the latches to swing on their pivots 36 and cause them to assume the dotted line position of Figure 2. The hooks 26 are now removed from the keepers 44 and the continued application of force on the handles 28 will raise the hood 8 on its hinge 11. When the hood is lowered and the parts in the dotted line position of Figure 2, the operator may press downwardly on the handles 28 which will give a combined pivotal and bodily movement to the latches to force the catches 26 under the keepers 44. The spring 32 will now retain the parts in the full line position of Figure 2.

In the species of Figures 4 and 5, the projection 30' is in the form of a flat bar and is formed integral with the hook member 24'. The coil spring 32 surrounds the extension 30' and is held therein by means of a washer 52 which has a bent edge 54 which rides over the inner face of the bracket 18 to facilitate the operation of the latch. The lower end of the coil spring 32 rests on the ears 22' of the bracket 18.

By referring to Figures 2 and 4, it is to be noted that the latching member or handle hook is designed so that there is a continuous camming effect exerted which tends to increase the latching action. Any upward or outward pull on the hood which would change the pivot point 36 in a transverse or upward direction will increase this camming action or effect.

We claim:

1. In a latch for retaining the hoods of automotive vehicles, a stationary keeper secured on the vehicle and totally concealed by the hood, a bracket secured to the inside of the hood, a hook member directly pivoted to the bracket and having an integral handle extending outside the hood through an opening in the hood, the opening of said pivot being elongated to permit a limited bodily movement of the hook member and handle, an extension on said hook member, and resilient means secured to said extension and constantly urging said hook to engage with the keeper.

2. In a latch for retaining the hoods of automotive vehicles, a stationary keeper secured on the vehicle and normally concealed by the hood, a bracket secured on the inside of the hood, a hook member including a handle directly pivoted to the bracket and adapted to engage said keeper, said handle extending outside the hood to operate the hood, the pivotal opening of said pivoted member being elongated to permit of a limited bodily movement of the latch, and means to retain said hook in engagement with said keeper.

3. In a latch for retaining the hoods of automotive vehicles, a stationary keeper secured to the vehicle and normally concealed by the hood, a bracket secured on the inside of the hood, a hook member directly pivoted to the bracket and adapted to engage under the keeper to hold said hood, an operating handle on said member extending outside the hood, an extension on said hook member projecting away therefrom, a spring surrounding said extension and held thereon between the extension and the bracket and constantly urging said hook member into engagement with the keeper, the openings of said pivot being enlarged to permit of a limited bodily movement of said hook member.

4. In a latch for retaining the hoods of vehicles, a stationary keeper secured to the vehicle and normally concealed by the hood, a bracket secured to the inside of the hood, ears on the bracket extending interiorly of the hood, a hook member pivoted between the ears, the hook adapted to engage with the keeper to hold the hood in latched position, and a spring mounted on the hook member between the hook member and the bracket and constantly urging the hook member against the keeper when in latched position, the pivot opening being enlarged to permit of bodily movement of the hook member.

5. In a latch for retaining the hoods of vehicles, a stationary keeper secured to the vehicle and normally concealed by the hood, a bracket secured to the inside of the hood, ears on the bracket extending interiorly of the hood, a hook member pivoted between the ears, the hook adapted to engage with the keeper to hold the hood in latched position, an extension on said member, and a spring surrounding said extension and retained thereon and constantly urging the hook member against the keeper when in latched position, the pivot opening being enlarged to permit of bodily movement of the hook member.

In testimony whereof we affix our signatures.

HOWARD B. HASKINS.
H. E. VAN VOORHEES.